United States Patent
McFarland

(10) Patent No.: US 8,270,761 B2
(45) Date of Patent: Sep. 18, 2012

(54) METHOD AND SYSTEM FOR DISPLAYING IMAGES

(75) Inventor: Thomas C McFarland, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 903 days.

(21) Appl. No.: 12/322,268

(22) Filed: Jan. 30, 2009

(65) Prior Publication Data

US 2010/0195928 A1 Aug. 5, 2010

(51) Int. Cl.
*G06K 9/36* (2006.01)

(52) U.S. Cl. ........ 382/282; 382/284; 382/294; 358/538; 358/540

(58) Field of Classification Search .................. 382/282, 382/284, 291; 358/537, 538, 540
See application file for complete search history.

(56) References Cited

U.S. PATENT DOCUMENTS

| | | | |
|---|---|---|---|
| 6,993,249 B1* | 1/2006 | Wiinter et al. | 386/230 |
| 7,027,081 B2* | 4/2006 | Kremen | 348/51 |
| 7,346,212 B2* | 3/2008 | Cheatle | 382/173 |
| 7,358,502 B1* | 4/2008 | Appleby et al. | 250/370.14 |
| 7,402,743 B2* | 7/2008 | Clark et al. | 84/615 |
| 7,455,528 B2* | 11/2008 | Cox et al. | 439/65 |
| 7,590,330 B2* | 9/2009 | Wiinter et al. | 386/248 |
| 7,611,358 B2* | 11/2009 | Cox et al. | 439/65 |
| 7,787,664 B2* | 8/2010 | Luo et al. | 382/118 |
| 2005/0211582 A1 | 9/2005 | Richards et al. | |
| 2007/0186154 A1 | 8/2007 | Anthony et al. | |

* cited by examiner

*Primary Examiner* — Yosef Kassa
(74) *Attorney, Agent, or Firm* — Garry A. Perry

(57) ABSTRACT

A method and system for displaying images are disclosed. In one embodiment, the method includes incorporating a plurality of related images into an image boundary, applying the image boundary to border at least one key image, and displaying the at least one key image and the image boundary in a display area.

20 Claims, 6 Drawing Sheets

METHOD AND SYSTEM FOR DISPLAYING IMAGES

BACKGROUND OF THE INVENTION

Users of photograph image software and image processing systems may desire to use multiple images to tell a story in a concise and appealing manner, yet in the context of a larger collection. In such situations, a storybook photo album may not be sufficient due to the users not wanting to utilize multiple pages or screens. Likewise, attempts to present multiple related images on a single page or screen are frequently deemed aesthetically undesirable or confusing. Users desiring to present related images in an attractive and concise manner often deem the process burdensome, time consuming, and in some cases simply beyond their artistic capabilities.

BRIEF DESCRIPTION OF THE DRAWINGS

The accompanying drawings illustrate various embodiments of the principles described herein and are a part of the specification. The illustrated embodiments are merely examples and do not limit the scope of the claims. Throughout the drawings, identical reference numbers designate similar, but not necessarily identical elements.

DETAILED DESCRIPTION OF EMBODIMENTS

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an embodiment", "an example" or similar language means that a particular feature is included in at least that one embodiment, but not necessarily in other embodiments. The various instances of the phrase "in one embodiment" or similar phrases in various places in the specification are not necessarily all referring to the same embodiment. The terms "comprises/comprising", "has/having", and "includes/including" are synonymous, unless the context dictates otherwise.

Figure 1:
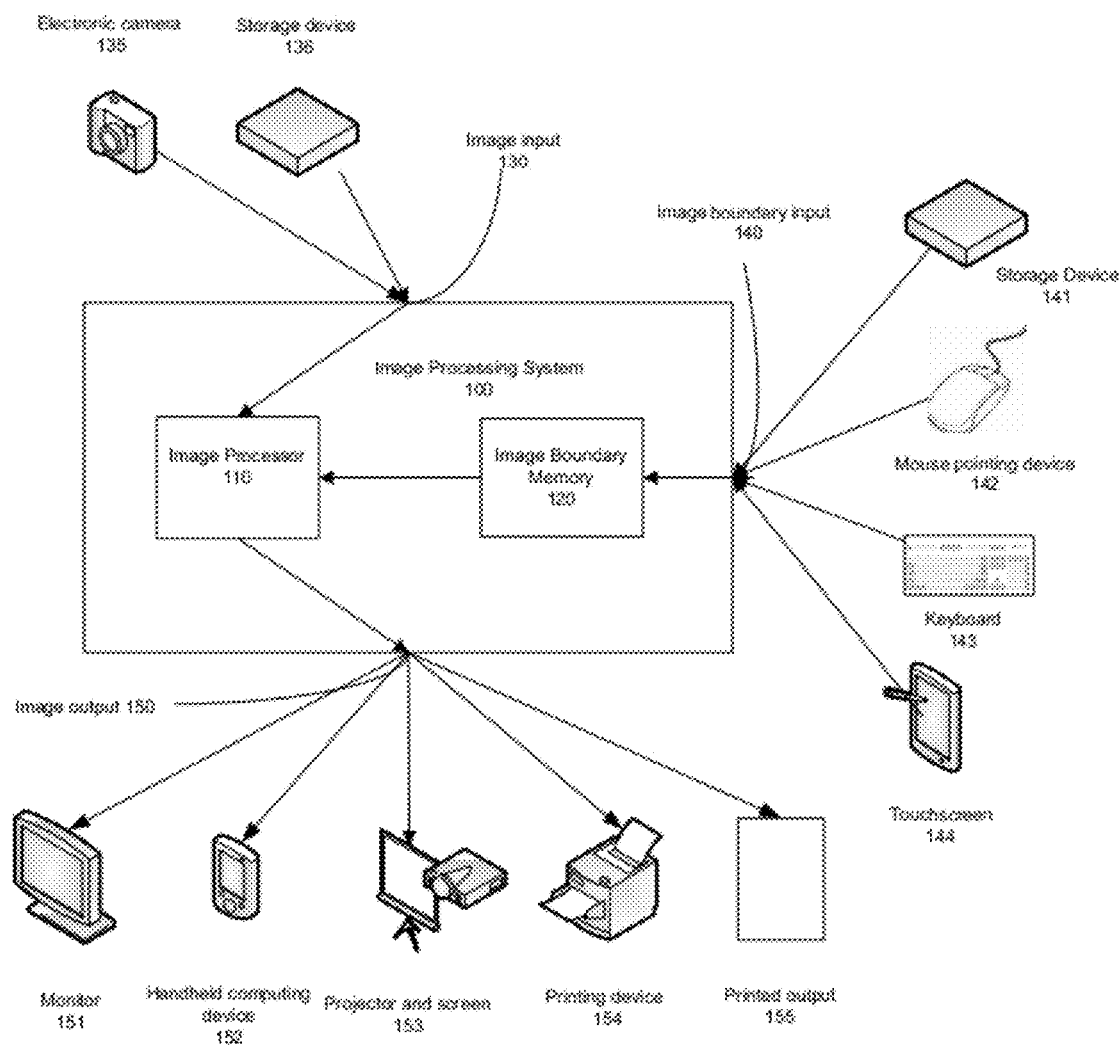
FIG. 1 is a block diagram for a system of displaying images according to an embodiment of the invention.

FIG. 1 is a schematic diagram of an image processing system in accordance with one embodiment of the invention. As used in the present specification and in the appended claims, the term "image" refers to an optically formed duplicate or other reproduction of an object formed by a lens or mirror, stored in digital format. Image processing system 100 according to this embodiment includes image input 130, image boundary input 140, image boundary memory 120, image processor 110, and image output 150.

Image input 130 feeds images to image processor 110. Image input 130 connects to one or more image sources. In the embodiment shown in FIG. 1, image input 130 connects to an electronic camera 135 and storage device 136. Camera 135 can be any type of camera, including a cell phone or other multifunction device that captures images and stores them in digital format. Storage device 136 can be any type of device that electronically stores one or more digital images, including a hard disk drive or memory card.

Image boundary input 140 is arranged to receive image boundaries. In the embodiment shown in FIG. 1, image boundary input 140 connects to a storage device 141. Storage device 141 can be any type of device that electronically stores one or more digital images, pictures, drawings or graphics, including a hard disk drive or memory card. Image boundary input 140 is also arranged to receive image boundaries from a user input via an input device. In the embodiment shown in FIG. 1, image boundary input 140 connects to a mouse pointing device 142, keyboard 143, and a touchscreen 144. Image boundary input 140 connects to an image boundary memory 120 that holds the template boundaries and user-created custom boundaries. Image boundary memory 120 may be physical or virtual. In an embodiment, image boundary memory 120 may be in the form of volatile memory, disc drive, or non-volatile memory, including flash memory, on-board or captive digital memory, or removable digital memory such as a Secure Digital (SD) card or removable/portable disc drive.

Image boundary memory 120 connects to image processor 110. Image processor 110 is configured to incorporate the plurality of images that the image processor receives via image input 130 into an image boundary received via image boundary input 140. Image processor 110 is also configured to apply the image boundary that has been processed to at least one image that has been selected by the user or the system as a key image. As used in this specification and the appended claims, "key image" implies an image that has been selected to be emphasized by various means, including but not limited to making the key image larger in relationship to other images, placing the key image at the forefront in relationship to other images, and centering the key image in relationship to other images.

Image processor 110 connects to image output 150. Image output 150 is configured to send images, now bounded by an image boundary, that have been generated by image processor 110 to one or more output devices that has a display area. In the embodiment shown, image output 150 is connected to monitor 151, handheld computing device 152, projector and screen 153, printing device 154 and printed output 155. Monitor 151, handheld computing device 152, and projector and screen 153 can be of any display type such as a cathode ray tube, flat panel, liquid crystal, or make use of other suitable display technology. Printing device 154 can represent an inkjet, LaserJet, or any other printer technology that enables images to be printed onto a hard copy surface. Further any of the output devices shown in FIG. 1 need not be directly or physically coupled to the image output 150, but may be connected through an intervening computer network, such as a wireless or wireline local area network, a wide area network, or the Internet.

Image processing system 100 may be integral with a computer. As used in this specification and the appended claims, "computer" implies any device containing a microprocessor or CPU, and shall include, but not be limited to, personal computers, handheld computing devices, workstations, mainframes, and supercomputers.

Alternatively, image processing system 100 may be integral with an image capture system in which case the processed image may be directly downloaded to another device such as a printing device or computer.

Alternatively, the image processing system 100 may be integral with a printing device so that the processed image may be printed immediately.

Figure 2:
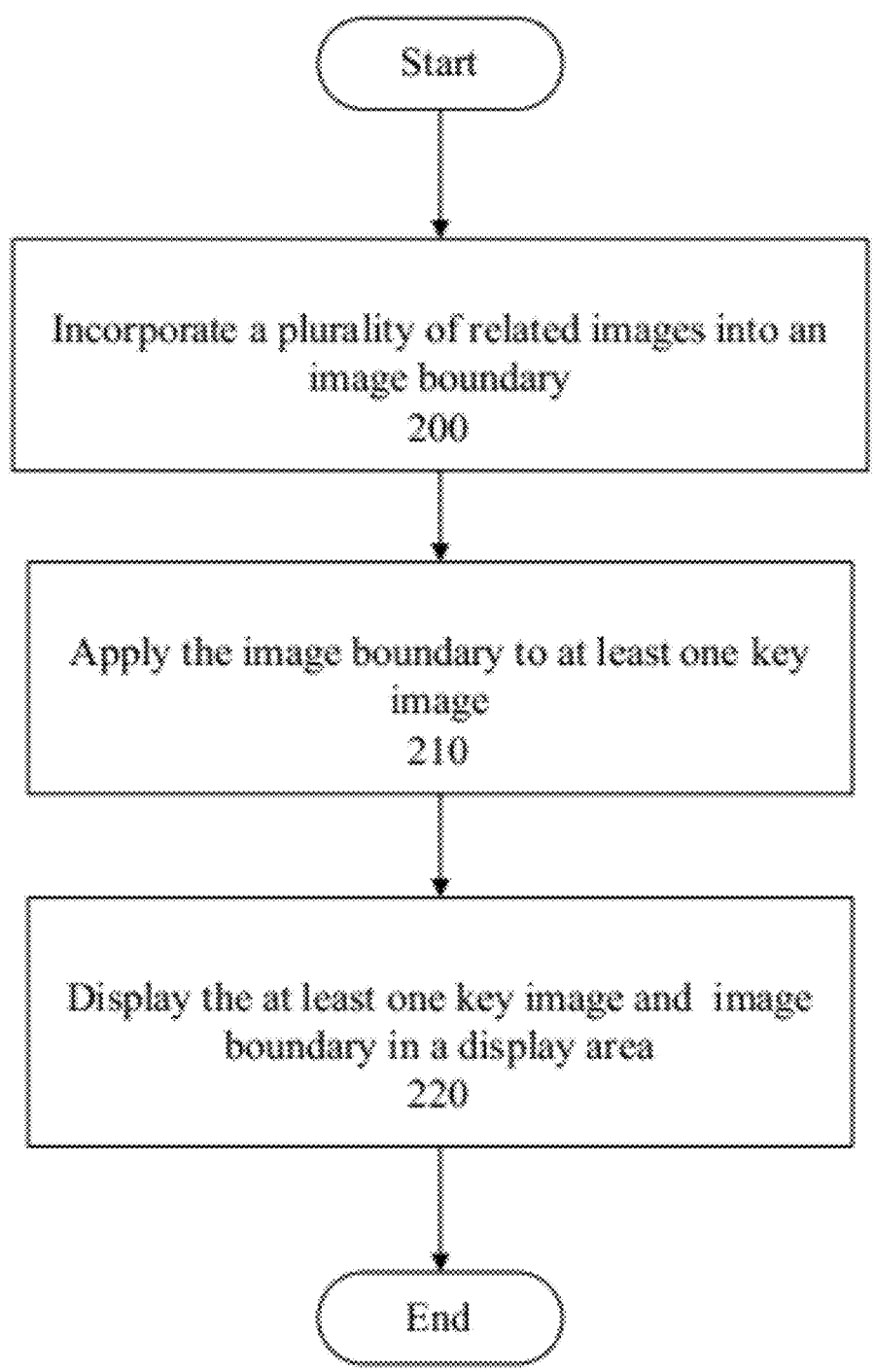
FIG. 2 is a flowchart for a method of displaying images according to an embodiment of the invention.

FIG. 2 is a flowchart for one embodiment of the invention, a method for displaying images. The method of FIG. 2 begins at block 200 in which a plurality of related images are incorporated into an image boundary. As used in this specification and the appended claims, "related images" implies images that share at least one characteristic, or images that pertain to a common theme, subject, or event.

The method continues at block 210 in which the image boundary is applied to at least one key image. In one example, a key image is one that has been selected by the user for to be placed at the forefront as a centered image for purposes of emphasis.

The method continues at block 220 in which the at least one key image and boundary are displayed in a display area. In an example a display area may be in the form of a computer monitor, handheld computing device, projector and screen, a screen incorporated in any electronic device, a printing device, or printed output.

Figure 3:
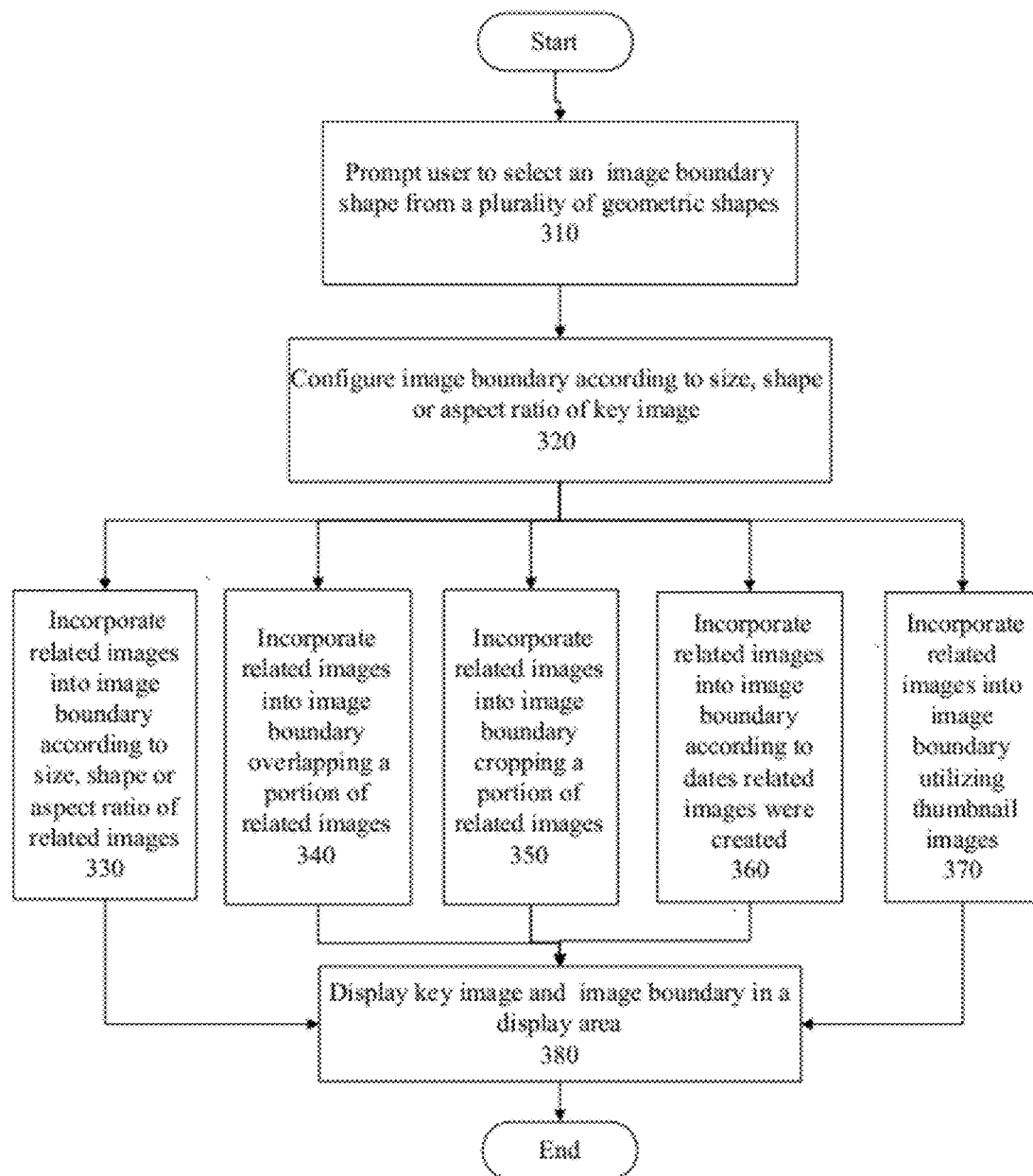
FIG. 3 is a second flowchart for a method of displaying images according to an embodiment of the invention.

FIG. 3 is a flowchart for one embodiment of the invention, a method for displaying images. The method of FIG. 3 begins at block 310 in which a user is prompted to select an image boundary from a plurality of image boundaries. In an embodiment of the invention, the user may choose from image boundaries of different geometric shapes, styles, color and tint.

The method continues at block 320 in which the image boundary is configured according to the size, shape, or aspect ratio of a key image. In one example, a key image is one that has been selected by the user for to be larger than the other images for purposes of emphasis.

In one embodiment of the invention, the method continues at block 330 in which related images are incorporated into the image boundary according to the size, shape or aspect ratio of the related images.

In another embodiment, block 330 is not executed and the method continues at block 340 in which related images are incorporated into the image boundary overlapping portions of the related images. In an embodiment, overlapping of images may be performed in a manner to exclude unimportant or unwanted portions of the images.

In another embodiment, blocks 330 and 340 are not executed and the method continues at block 350 in which related images are incorporated into the image boundary cropping portions of the related images. In an embodiment, cropping of images may be performed in a manner to exclude unimportant or unwanted portions of the images.

In another embodiment, blocks 330, 340, and 350 are not executed and the method continues at block 360 in which related images are incorporated into the image boundary according to dates the related images were created.

In another embodiment, blocks 330, 340, 350, and 360 are not executed and the method continues at block 370 in which related images are incorporated into the image boundary utilizing thumbnail images. In an embodiment, the thumbnail images are of a lesser height and lesser width, yet preserve the original aspect ratio, as compared to the related images prior to incorporation.

The method continues at block 380 in which the key image and the image boundary are displayed in display area. In one embodiment, the display area is printed output. In another embodiment, the display area is the screen of a handheld computing device.

Figure 4:
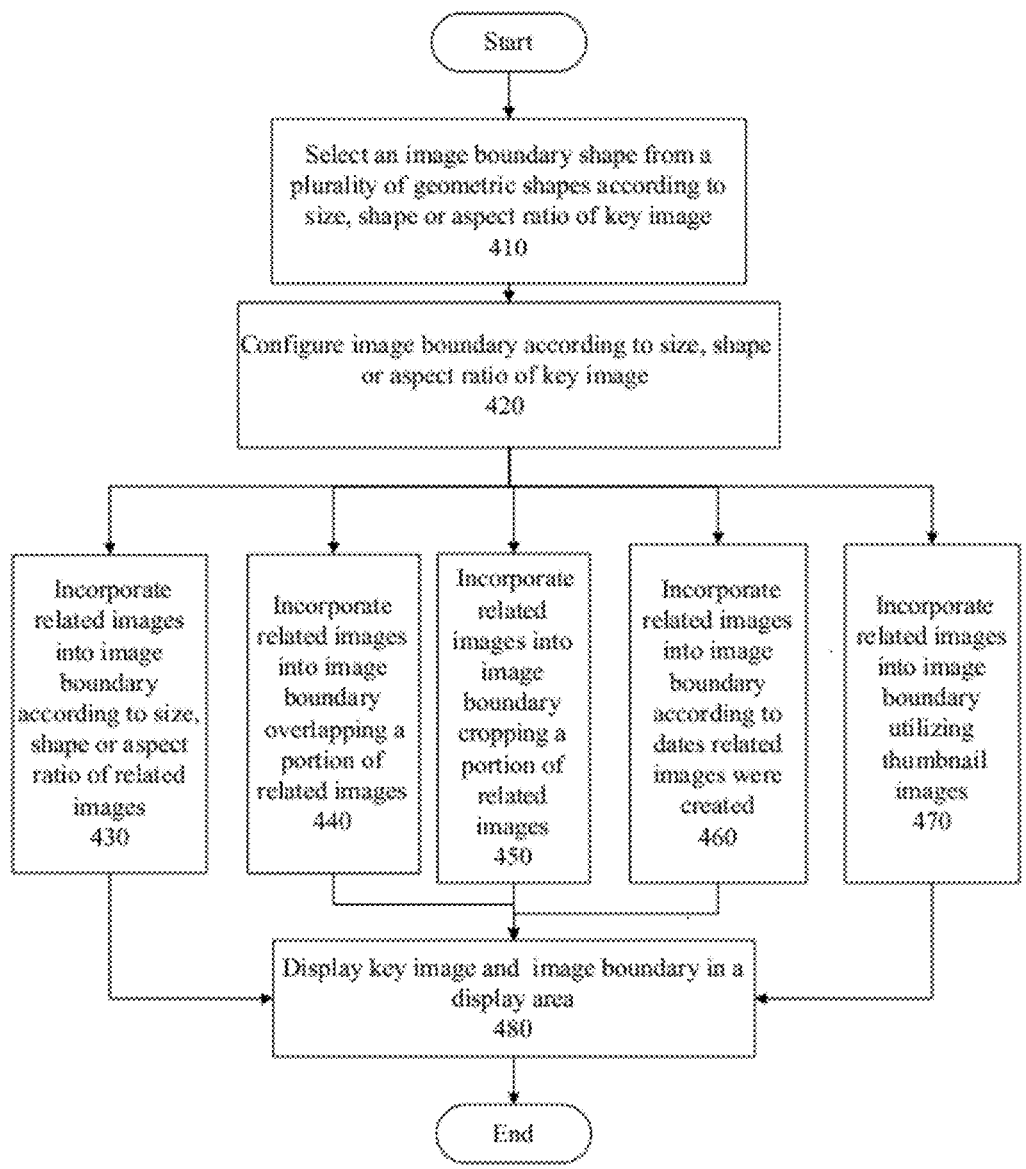
FIG. 4 is a third flowchart for a method of incorporating displaying images according to an embodiment of the invention.

FIG. 4 is a flowchart for one embodiment of the invention, a method for displaying images. The method of FIG. 4 begins at block 410 in which an image boundary is selected from a plurality of image boundaries according to the size, shape, or aspect ratio of a key image. In one example, the key image is one that has been selected by the user for to be placed at the forefront or as a centered image for purposes of emphasis.

The method continues at block 420 in which the image boundary is configured according to the size, shape or aspect ratio of a key image.

In one embodiment of the invention, the method continues at block 430 in which related images are incorporated into the image boundary according to the size, shape or aspect ratio of the related images.

In another embodiment, block 430 is not executed and the method continues at block 440 in which related images are incorporated into the image boundary overlapping portions of the related images. In an embodiment, overlapping of images may be performed in a manner to emphasize desirable portions of the related images.

In another embodiment, blocks 430 and 440 are not executed and the method continues at block 450 in which related images are incorporated into the image boundary cropping portions of the related images. In an embodiment, cropping of images may be performed in a manner to emphasize desirable portions of the related images.

In another embodiment, blocks 430, 440 and 450 are not executed and the method continues at block 460 in which related images are incorporated into the image boundary according to dates the related images were created.

In another embodiment, blocks 430, 440, 450 and 460 are not executed and the method continues at block 470 in which related images are incorporated into the image boundary utilizing thumbnail images. In an embodiment, the thumbnail images are of a lesser height and lesser width, yet preserve the original aspect ratio, as compared to the related images prior to incorporation.

The method continues at block 480 in which the key image and the image boundary are displayed in display area. In one embodiment, the display area is printed output generated by a printing device. In another embodiment, the display area is a computer monitor.

Figure 5:
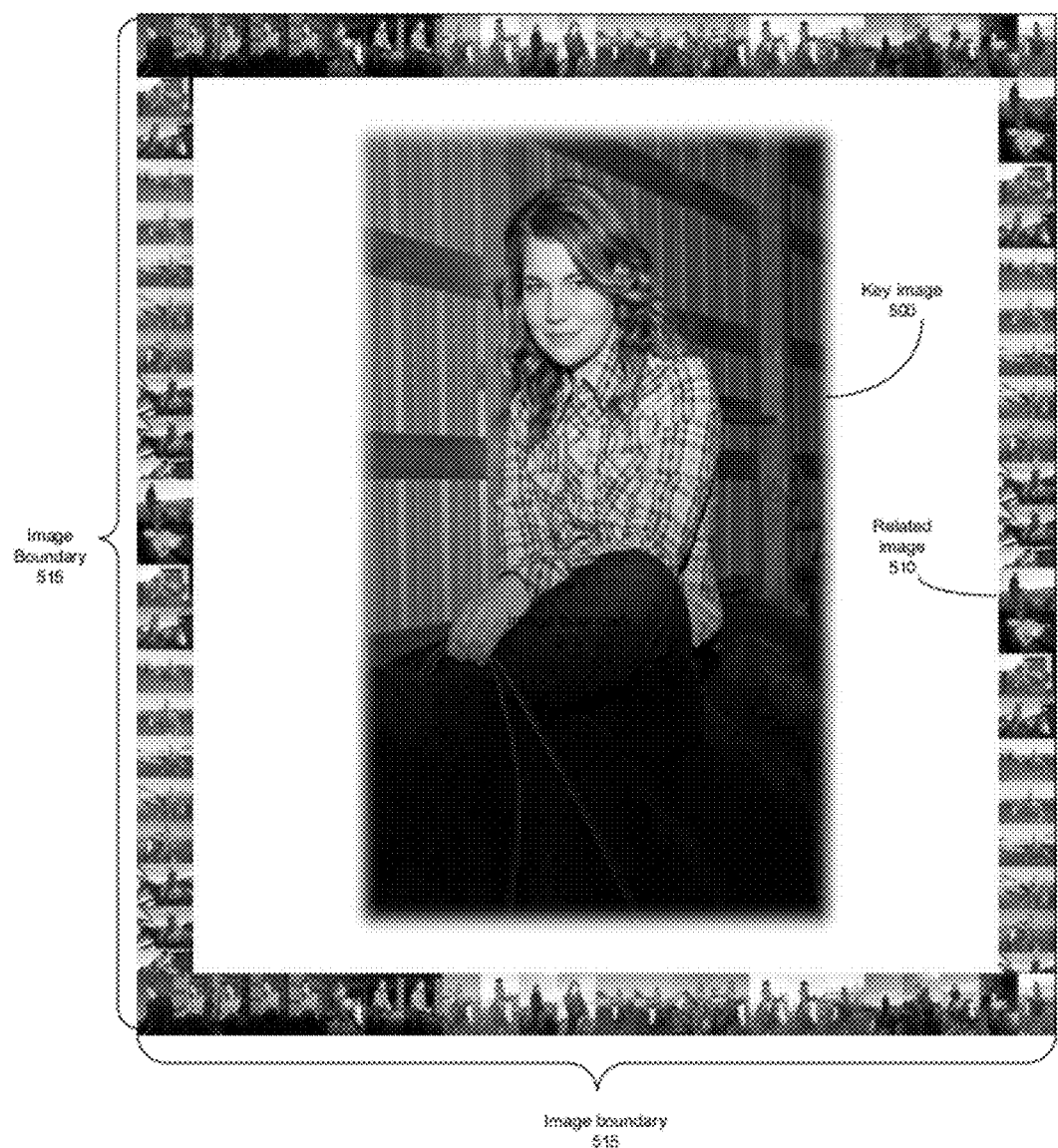
FIG. 5 shows a processed composite electronic image according to an embodiment of the invention.

FIG. 5 shows a processed composite electronic image that contains a key image 500 of a girl on a horse approximately in its center. A plurality of related images 510 are incorporated into an image boundary 515. The image boundary 515 is configured to border the key image 500.

Figure 6:
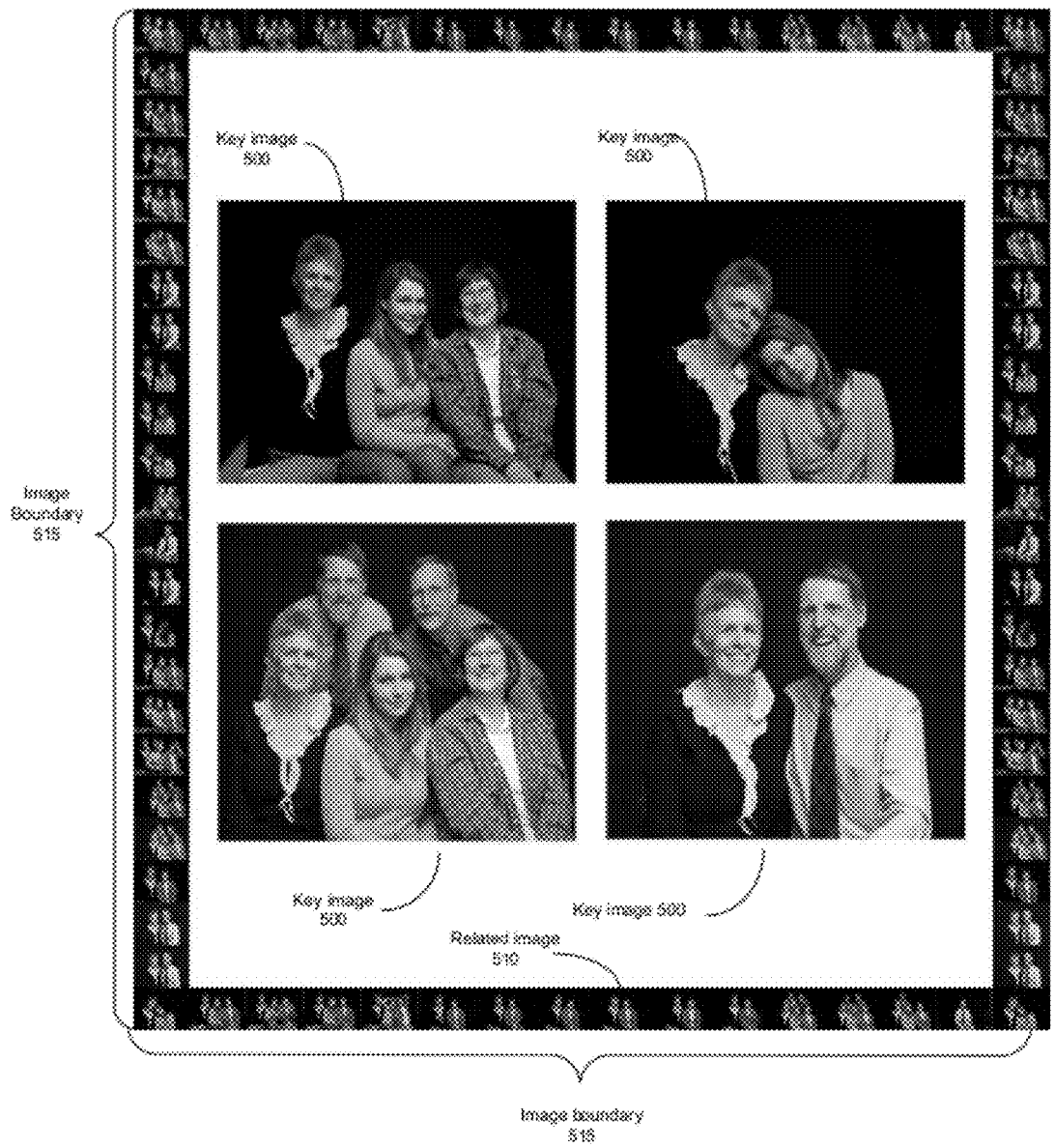
FIG. 6 shows a second processed composite electronic image according to an embodiment of the invention.

FIG. 6 shows a processed composite electronic image that contains four key images 500 of family members. A plurality of related images 510 are incorporated into an image boundary 515. The image boundary 515 is configured to border the key images 500.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A non-transitory computer-readable medium having computer executable instructions thereon which, when executed, cause a processor to perform a method, the method comprising:

incorporating a plurality of related images into an image boundary;

applying the image boundary to border at least one key image; and displaying the at least one key image and the image boundary in a display area.

2. The medium of claim 1, wherein the method further comprises prompting a user to select the image boundary from a plurality of image boundaries.

3. The medium of claim 1, wherein the method further comprises selecting an image boundary from a plurality of image boundaries based upon an algorithm that considers at least one of the group consisting of size, shape, and aspect ratio of the at least one key image.

4. The medium of claim 1, wherein the method further comprises configuring the image boundary to border at least one key image in accordance with an algorithm that considers at least one of the group consisting of size, shape, and aspect ratio of the at least one key image.

5. The medium of claim 1, wherein the method further comprises incorporating the related images into the image boundary according to an algorithm that considers at least one of the group consisting of size, shape, and aspect ratio of the related images.

6. The medium of claim 1, wherein the method further comprises overlapping a portion of at least one of the related images as such related images are incorporated into the image boundary.

7. The medium of claim 1, wherein the method further comprises cropping at least one of the related images as such related images are incorporated into the image boundary.

8. The medium of claim 1, wherein the method further comprises incorporating the related images into the image boundary according to an algorithm that considers the dates that the related images were created.

9. The medium of claim 1, wherein the method further comprises incorporating the related images into the image boundary in such a manner that the incorporated related images are of a lesser height and lesser width, yet preserve the original aspect ratio, as to compared to the related images prior to incorporation.

10. An image processing system for arranging a plurality of related images in a display area, comprising:
   a first input configured to receive a plurality of related images;
   an image processor coupled to the first input; and
   an output coupled to the image processor, configured to output a processed arrangement of images;
   wherein the image processor is configured to:
      to incorporate the plurality of related images into an image boundary; and
      to apply the image boundary to border at least one key image.

11. The system of claim 10, further comprising a second input coupled to an image boundary memory, which image boundary memory is in turn coupled to the image processor, wherein the second input is configured to receive an image boundary.

12. The system of claim 10, wherein the image processor is further configured to prompt a user to select the image boundary from a plurality of image boundaries.

13. The system of claim 10, wherein the image processor is further configured to select an image boundary from a plurality of image boundaries based upon an algorithm that considers at least one of the group consisting of size, shape, and aspect ratio of the at least one key image.

14. The system of claim 10, wherein the image processor is further configured to arrange the image boundary to border at least one key image in accordance with an algorithm that considers at least one of the group consisting of size, shape, and aspect ratio of the at least one key image.

15. The system of claim 10, wherein the image processor is further configured to incorporate the related images into the image boundary according to an algorithm that considers at least one of the group consisting of size, shape, and aspect ratio of the related images.

16. The system of claim 10, wherein the image processor is further configured to overlap a portion of at least one of the related images as such related images are incorporated into the image boundary.

17. The system of claim 10, wherein the image processor is further configured to crop at least one of the related images as such related images are incorporated into the image boundary.

18. The system of claim 10, wherein the image processor is further configured to incorporate the related images into the image boundary according to an algorithm that considers the dates that the related images were created.

19. The system of claim 10, wherein the image processor is further configured to incorporate the related images into the image boundary in such a manner that the incorporated related images are of a lesser height and lesser width, yet preserve the original aspect ratio, as to compared to the related images prior to incorporation.

20. A device for displaying images comprising:
   means for receiving a plurality of related images;
   means for generating a processed composite image by incorporating the plurality of related images into an image boundary and applying the image boundary to border at least one key image; and
   and the means for outputting the processed composite image.

* * * * *

UNITED STATES PATENT AND TRADEMARK OFFICE
CERTIFICATE OF CORRECTION

| | | |
|---|---|---|
| PATENT NO. | : 8,270,761 B2 | Page 1 of 1 |
| APPLICATION NO. | : 12/322268 | |
| DATED | : September 18, 2012 | |
| INVENTOR(S) | : Thomas C McFarland | |

It is certified that error appears in the above-identified patent and that said Letters Patent is hereby corrected as shown below:

In column 6, line 47, in Claim 20, before "the" delete "and".

Signed and Sealed this
Nineteenth Day of February, 2013

Teresa Stanek Rea
*Acting Director of the United States Patent and Trademark Office*